United States Patent
Shindo et al.

(10) Patent No.: US 6,296,783 B1
(45) Date of Patent: *Oct. 2, 2001

(54) GEL-FORM SOLID POLYMER ELECTROLYTE

(75) Inventors: Masaharu Shindo, Sodegaura-si; Takako Sasano, Sodegaura, both of (JP)

(73) Assignee: Mitsui Chemicals, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/117,382
(22) PCT Filed: Nov. 28, 1997
(86) PCT No.: PCT/JP97/04355
§ 371 Date: Jul. 29, 1998
§ 102(e) Date: Jul. 29, 1998
(87) PCT Pub. No.: WO98/25275
PCT Pub. Date: Jun. 11, 1998

(30) Foreign Application Priority Data

Dec. 3, 1996 (JP) .................................................. 8-323224

(51) Int. Cl.⁷ ..................................................... H01B 1/00
(52) U.S. Cl. ........................... 252/500; 252/506; 252/509; 252/518.1; 526/314; 526/187; 526/225; 526/167; 526/174; 526/401
(58) Field of Search ..................................... 252/500, 511, 252/512, 518.1, 506, 509; 526/314, 187, 225, 167, 174, 401, 404, 408, 462

(56) References Cited

U.S. PATENT DOCUMENTS 5,977,277 * 11/1999 Yokoyama et al. ................... 526/314

FOREIGN PATENT DOCUMENTS

| 0787749 A1 | 8/1997 | (EP) . |
| 8298126 | 11/1996 | (JP) . |
| WO 9706207 | 2/1997 | (WO) . |

OTHER PUBLICATIONS

Patent Abstracts of Japan; vol. 18, No. 586; Nov. 9, 1994 & JP 06 223842; Aug. 12, 1994.
Patent Abstracts of Japan; vol. 017, No. 309; Jun. 14, 1993 & JP 05 025353; Feb. 2, 1993.

Josh H. Golden et al.; Macromolecules, vol. 28, 1995, pp. 3468–3470.

* cited by examiner

Primary Examiner—Yogendra Gupta
Assistant Examiner—D G. Hamlin
(74) Attorney, Agent, or Firm—Birch, Stewart, Kolasch & Birch, LLP

(57) ABSTRACT

A polymeric gel electrolyte comprising:

(a) an acrylic ester polymer matrix containing structural units derived from at least one acrylic ester selected from among acrylic esters represented by the general formulae:

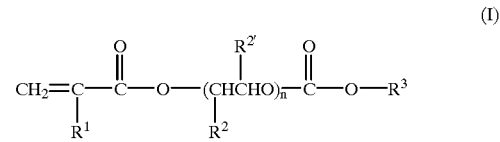

and

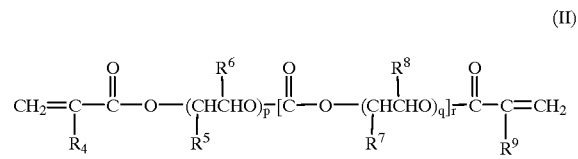

(wherein, in the formula (I), $R^1$, $R^2$ and $R^{2'}$ are identical with or different from each other and represent a hydrogen atom or an alkyl group having 1 to 4 carbon atoms, $R^3$ represents an alkyl group having 1 to 4 carbon atoms, and n is an integer of 1 to 100; and, in the formula (II), $R^4$ to $R^9$ are identical with or different from each other and represent a hydrogen atom or an alkyl group having 1 to 4 carbon atoms, and p, q and r are identical with or different from each other and are an integer of 1 to 100); (b) a nonaqueous solvent of a carbonic ester; and (c) a salt of a metal of Group Ia of the periodic table. This polymeric gel electrolyte uses an acrylic ester polymer as a polymeric matrix and contains a specified nonaqueous solvent, so that it exhibits high ionic conductivity and is electrochemically stable. Thus, the polymeric gel electrolyte can suitably be used in electrochemical devices such as a primary battery, a secondary battery, a capacitor and an electrochromic display and in medical actuators.

15 Claims, No Drawings

GEL-FORM SOLID POLYMER ELECTROLYTE

This application is the national phase under 35 U.S.C. §371 of prior PCT International Application No. PCT/JP97/04355 which has an International filing date of Nov. 28, 1997 which designated the United States of America, the entire contents of which are hereby incorporated by reference.

TECHNICAL FIELD

The present invention relates to a polymeric gel electrolyte for use in, for example, a primary battery, a secondary battery or a capacitor.

BACKGROUND ART

It is common practice to use liquid electrolytes in electrochemical devices such as a primary battery, a secondary battery and a capacitor. However, the liquid electrolytes have a drawback in that they are likely to cause a liquid leakage to thereby render their long-term reliability unsatisfactory.

The use of a solid electrolyte is known as means for solving this problem. When the solid electrolyte is used in the above electrochemical device, not only can the liquid leakage be avoided to thereby provide a highly reliable device but also the device itself can be miniaturized with its weight reduced. In recent years, various polymeric solid electrolytes (solid polymer electrolytes) have been investigated as providing the above solid electrolyte. The polymeric solid electrolyte not only possesses such a flexibility that its versatile use can be effected irrespective of a volume change which occurs in the course of ion electron exchange reaction between an electrode and the polymeric solid electrolyte but also has the above characteristics of the solid electrolyte. A composite of a polyethylene oxide having a polyether structure and an alkali metal salt such as a lithium salt is known as providing an example of the above polymeric solid electrolyte. Further, Japanese Patent Laid-open Publication No. 5(1993)-25353 describes a polymeric solid electrolyte consisting mainly of a polyoxyalkylene diester compound, a polymethoxyoxyalkylene ester compound, a crosslinked resin of a copolymer with an oxy compound having a double bond and an inorganic salt. Still further, Japanese Patent Laid-open Publication No. 6(1994)-223842 describes a polymeric solid electrolyte composed of an organic polymer having carbonate groups as a functional group and a metal salt.

However, the ionic conductivity of the solid electrolyte is generally lower than that of the liquid electrolyte, so that it has been difficult to obtain primary and secondary batteries exhibiting excellent discharge characteristics from the solid electrolyte. In the above circumstances, there is a demand for the development of a polymeric solid electrolyte which can satisfy requirements for, for example, enhanced ionic conductivity and electrochemical stability.

OBJECT OF THE INVENTION

The present invention has been made in view of the above prior art, and it is an object of the present invention to provide a polymeric gel electrolyte which exhibits a high ionic conductivity and is chemically stable.

DISCLOSURE OF THE INVENTION

The polymeric gel electrolyte of the present invention comprises:

(a) an acrylic ester polymer matrix containing structural units derived from at least one acrylic ester selected from among acrylic esters represented by the general formulae (I) and (II):

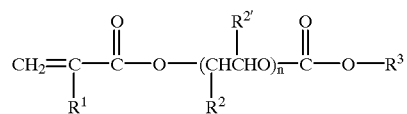

wherein $R^1$, $R^2$ and $R^{2'}$ are identical with or different from each other and represent a hydrogen atom or an alkyl group having 1 to 4 carbon atoms, $R^3$ represents an alkyl group having 1 to 4 carbon atoms, and n is an integer of 1 to 100, and

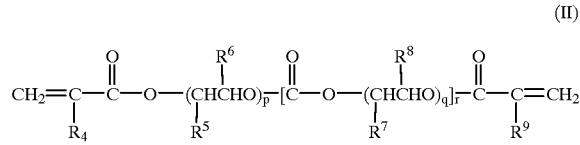

wherein $R^4$ to $R^9$ are identical with or different from each other and represent a hydrogen atom or an alkyl group having 1 to 4 carbon atoms, and p, q and r are identical with or different from each other and are an integer of 1 to 100;

(b) a nonaqueous solvent of a carbonic ester (carbonic acid ester); and (c) a salt of a metal of Group Ia of the periodic table.

It is preferred that the acrylic ester polymer matrix be a homopolymer or copolymer of an acrylic ester selected from among acrylic esters represented by the general formulae (I) and (II).

It is also preferred that the acrylic ester polymer matrix be a copolymer of:

an acrylic ester represented by the general formula (I) or (II), and a vinyl monomer, vinylidene monomer or vinylene monomer copolymerizable with the acrylic ester represented by the general formula (I) or (II).

The nonaqueous solvent is preferably at least one carbonic ester selected from among cyclic carbonic esters and chain carbonic esters.

The nonaqueous solvent may be a mixed solvent of a cyclic carbonic ester and a chain carbonic ester.

The salt of metal of Group Ia of the periodic table is preferably at least one lithium salt selected from among $LiClO_4$, $LiBF_4$, $LiPF_6$, $LiAsF_6$, $LiCF_3SO_3$, $LiN(CF_3SO_2)_2$ and $LiC(CF_3SO_2)_3$.

The polymeric gel electrolyte of the present invention is preferably produced by performing a simultaneous polymerization of a solution containing the salt of metal of Group Ia of the periodic table, the nonaqueous solvent of carbonic ester and the acrylic ester represented by the general formula (I) or (II).

BEST MODE FOR CARRYING OUT THE INVENTION

The polymeric solid electrolyte of the present invention will be described in detail below.

The terminology "polymerization" used herein may mean both of homopolymerization and copolymerization without being limited to homopolymerization. The terminology "opolymer" used herein may mean both of homopolymer and copolymer without being limited to homopolymer. The terminology "acrylic ester" used herein means not only an ester of acrylic acid but also an ester of acrylic acid whose hydrogen atom has been substituted with an alkyl group, such as methacrylic acid.

[Acrylic Ester Polymer Matrix]

First, the acrylic ester polymer matrix for use in the present invention will be described.

The acrylic ester polymer matrix contains structural units derived from at least one acrylic ester selected from among acrylic esters represented by the general formulae (I) and (II).

Acrylic Esters Represented by the Formula (I)

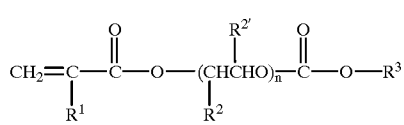
(I)

In the formula, $R^1$, $R^2$ and $R^{2'}$ are identical with or different from each other and represent a hydrogen atom or an alkyl group having 1 to 4 carbon atoms, preferably, a hydrogen atom or a methyl group.

$R^3$ represents an alkyl group having 1 to 4 carbon atoms, preferably, a methyl group, an ethyl group or a t-butyl group.

n is an integer of 1 to 100, preferably, 1 to 10.

Examples of the above acrylic esters represented by the general formula (I) include:

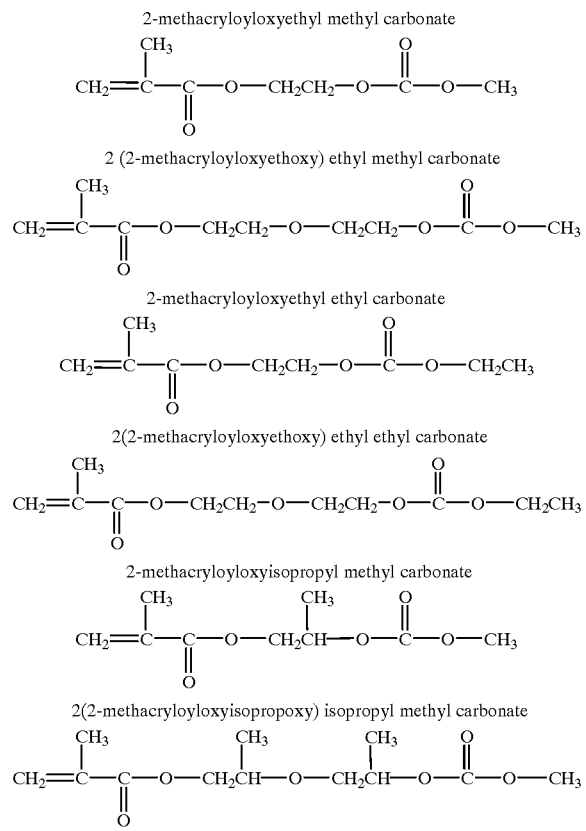

2-methacryloyloxyisopropyl ethyl carbonate
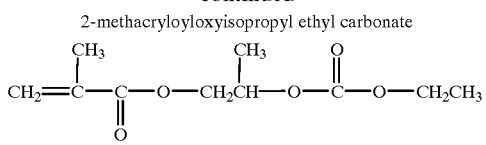

2(2-methacryloyloxyisopropoxy) isopropyl ethyl carbonate
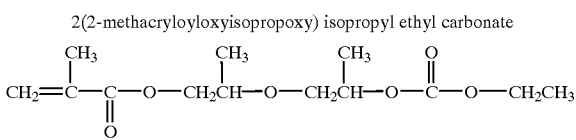

2-methacryloyloxy-2-methylethyl methyl carbonate,
2(2-methacryloyloxy-2-methylethoxy) isopropyl methyl carbonate,
2(2-methacryloyloxy-2-methylethoxy)-2-methylethyl methyl carbonate,
2(2-methacryloyloxyisopropoxy)-2-methylethyl methyl carbonate,
2-acryloyloxyethyl methyl carbonate

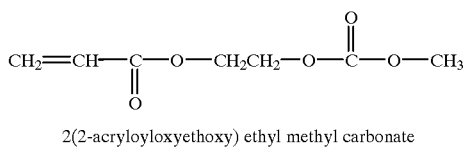

2(2-acryloyloxyethoxy) ethyl methyl carbonate
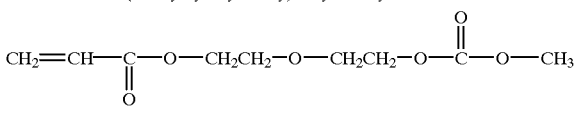

2-acryloyloxyethyl ethyl carbonate
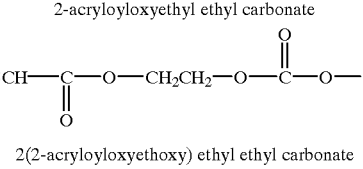

2(2-acryloyloxyethoxy) ethyl ethyl carbonate
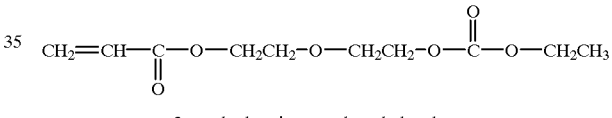

2-acryloyloxyisopropyl methyl carbonate
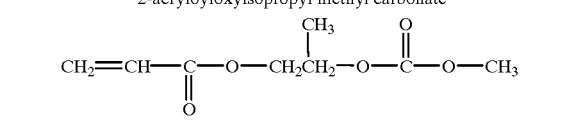

2(2-acryloyloxyisopropoxy) isopropyl methyl carbonate
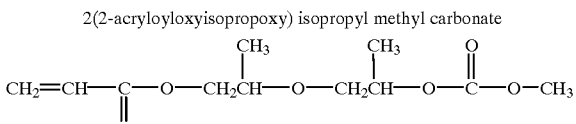

2-acryloyloxyisopropyl ethyl carbonate, and
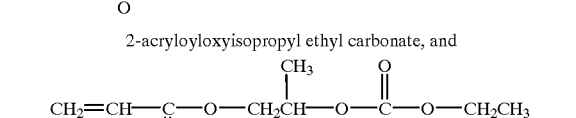

2(2-acryloyloxyisopropoxy) isopropyl ethyl carbonate
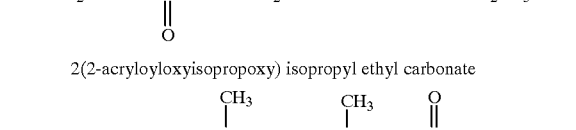

The acrylic ester represented by the above general formula (I) can be synthesized from, for example, the compound represented by the following general formula (i) and the compound represented by the following general formula (ii) in the following manner.

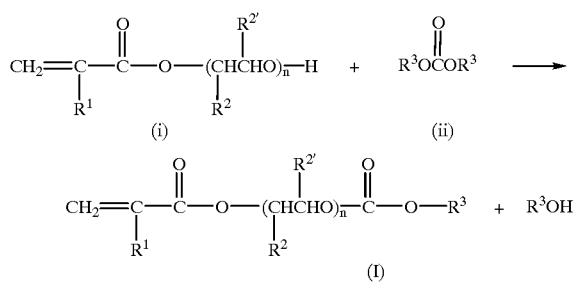

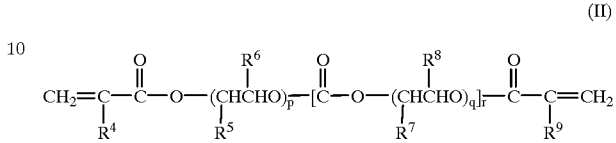

In the above formulae, $R^1$, $R^2$, $R^{2'}$, $R^3$ and n are as defined with respect to the above formula (I).

In the above synthesis, the compound represented by the general formula (ii) is used in an amount of 0.5 to 5 mol per mol of the compound represented by the general formula (i). Further, for example, $K_2CO_3$, $Na_2CO_3$, $Li_2CO_3$ and $NaOCH_3$ can be used as a catalyst in the above reaction. Such a catalyst is used in an amount of $1 \times 10^{-5}$ to $1 \times 10^{-2}$ mol per mol of the compound represented by the general formula (i).

The reaction of the compound represented by the general formula (i) and the compound represented by the general formula (ii) is generally conducted under agitation and under reflux while removing formed alcohol. The reaction temperature generally ranges from 40 to 140° C. and the reaction time generally ranges from 2 to 60 hr.

In the formula, $R^4$ to $R^9$ are identical with or different from each other and represent a hydrogen atom or an alkyl group having 1 to 4 carbon atoms, preferably, a hydrogen atom or a methyl group. p, q and r are identical with or different from each other and are an integer of 1 to 100, preferably, 1 to 10. Examples of the above acrylic esters represented by the general formula (II) include:

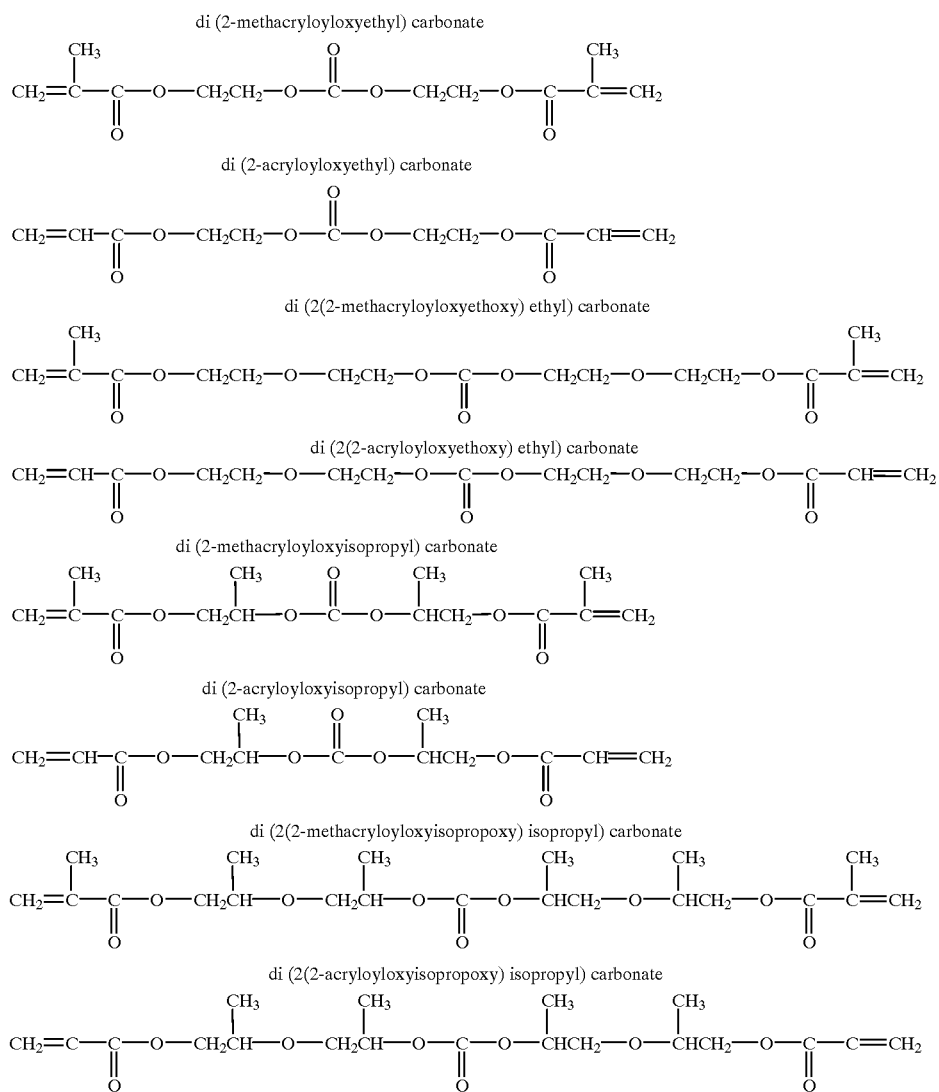

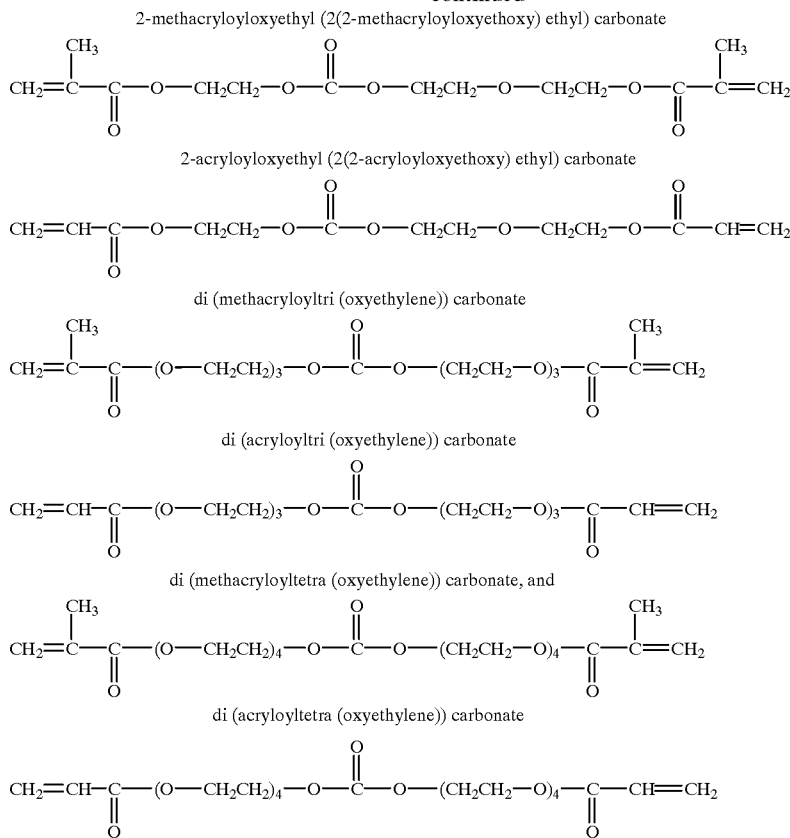

The acrylic ester represented by the above general formula (II) can be synthesized from, for example, the compound represented by the following general formula (iii) and the compound represented by the following general formula (iv) in the following manner.

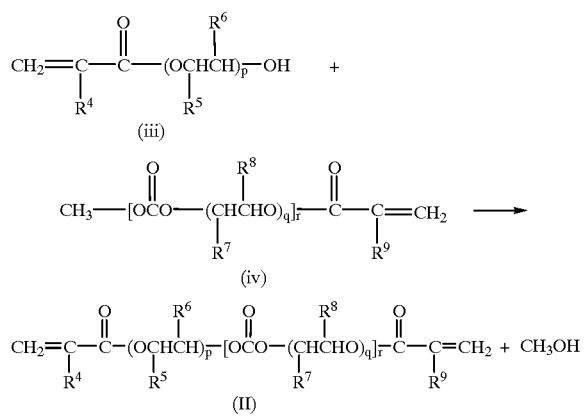

In the above formula, $R^4$ to $R^9$, and p, q and r are as defined with respect to the above formula (II).

In the above synthesis, the compound represented by the general formula (iv) is used in an amount of 0.3 to 2.0 mol per mol of the compound represented by the general formula (iii). Further, for example, $K_2CO_3$, $Na_2CO_3$, $Li_2CO_3$ and $NaOCH_3$ can be used as a catalyst in the above reaction. Such a catalyst is used in an amount of $1\times10^{-5}$ to $1\times10^{-2}$ mol per mol of the compound represented by the general formula (iii).

The reaction of the compound represented by the general formula (iii) and the compound represented by the general formula (iv) is generally conducted under agitation and under reflux while removing formed alcohol. The reaction temperature generally ranges from 40 to 140° C., preferably, 40 to 100° C. and the reaction time generally ranges from 2 to 60 hr.

The acrylic ester polymer matrix contains structural units derived from at least one acrylic ester selected from among acrylic esters represented by the above general formulae (I) and (II).

The above acrylic ester polymer matrix, for example, consists of:

(i) a homopolymer of an acrylic ester represented by the above general formula (I) or (II), (ii) a copolymer of at least two acrylic esters selected from among acrylic esters represented by the above general formula (I), (iii) a copolymer of at least two acrylic esters selected from among acrylic esters represented by the above general formula (II), (iv) a copolymer of at least one acrylic ester selected from among acrylic esters represented by the above general formula (I) and at least one acrylic ester selected from among acrylic esters represented by the above general formula (II), or (v) a copolymer of at least one acrylic ester selected from among acrylic esters represented by the above general formula (I) or (II) and at least one compound selected from among a vinyl monomer, vinylidene monomer and vinylene monomer copolymerizable with the above acrylic ester.

Preferred examples of the above vinyl, vinylidene and vinylene monomers copolymerizable with the acrylic ester include vinyl esters, vinyl ethers, (meth)acrylic esters, allyl ethers, allyl esters and cyclic olefins. Specific examples thereof include ethyl (meth)acrylate, ethoxyethyl (meth)acrylate, ethoxyethoxyethyl (meth)acrylate, polyethylene glycol (meth)acrylate, allyl alcohol, vinyl acetate, styrene, α-methylstyrene, vinyl chloride, vinylidene chloride, vinyl fluoride, vinylidene fluoride, acrylonitrile, vinyl cyanoacetate, allylamine, isopropylacrylamide, isobutene, isoprene, vinylene carbonate and maleic anhydride.

It is preferred that the molecular weight (number average molecular weight) of the above acrylic ester polymer matrix generally range from $2 \times 10^3$ to $1 \times 10^8$, especially, $1 \times 10^4$ to $1 \times 10^7$.

When the above polymer matrix is a copolymer of at least two acrylic esters selected from among acrylic esters represented by the above general formula (I), or a copolymer of at least two acrylic esters selected from among acrylic esters represented by the above general formula (II), although not particularly limited, the proportion of at least two types of structural units derived from acrylic esters represented by the above general formula (I) or (II) is preferred to fall in the range of 98/2 to 2/98 in terms of molar ratio.

Further, when the polymer matrix is a copolymer of at least one acrylic ester selected from among acrylic esters represented by the above general formula (I) and at least one acrylic ester selected from among acrylic esters represented by the above general formula (II), although not particularly limited, the proportion of at least two types of structural units derived from acrylic esters represented by the above general formula (I) and (II) is preferred to fall in the range of 98/2 to 2/98 in terms of molar ratio.

Still further, when the polymer matrix is a copolymer of an acrylic ester represented by the above general formula (I) or (II) and a vinyl monomer, vinylidene monomer or vinylene monomer copolymerizable with the above acrylic ester, it is desired that the molar ratio of structural units derived from an acrylic ester represented by the above general formula (I) or (II) to structural units derived from a vinyl monomer, vinylidene monomer or vinylene monomer generally fall in the range of 5:95 to 100:0, especially, 5:95 to 95:5 and, still especially, 10:90 to 90:10.

The molar ratio of structural units derived from an acrylic ester represented by the above general formula (I) or (II) to structural units derived from a vinyl monomer, vinylidene monomer or vinylene monomer copolymerizable therewith is regulated within the above range in accordance with the desired physical and chemical properties.

The above acrylic ester polymer matrix can be produced by the customary procedure.

For example, the acrylic ester polymer matrix can easily be produced by polymerizing, according to the radical polymerization or photopolymerization technique, (i) at least one member selected from among acrylic esters represented by the above general formula (I) or (II), (ii) at least one member selected from among acrylic esters represented by the above general formula (I) and at least one member selected from among acrylic esters represented by the above general formula (II), or (iii) at least one member selected from among acrylic esters represented by the above general formula (I) or (II), and at least one compound selected from among a vinyl compound, vinylidene compound and vinylene compound copolymerizable therewith.

This acrylic ester polymer matrix may contain structural units other than the structural units derived from acrylic esters of the general formula (I) and (II) and vinyl, vinylidene and vinylene compounds in an amount of, for example, up to 20 mol %.

[Polymeric Gel Electrolyte]

The polymeric gel electrolyte of the present invention comprises the above acrylic ester polymer matrix, a nonaqueous solvent of a carbonic ester and a salt of a metal of Group Ia of the periodic table. This polymeric gel electrolyte may either consist of the acrylic ester polymer matrix, a nonaqueous solvent of a carbonic ester and a salt of a metal of Group Ia of the periodic table or, if necessary, may contain other components.

The salt of metal of Group Ia of the periodic table is, for example, selected from among LiBr, LiI, LiSCN, LiClO$_4$, LiBF$_4$, LiAsF$_6$, LiPF$_6$, LiCF$_3$SO$_3$, LiAlCl$_4$, LiN(CF$_3$SO$_2$)$_2$, LiC(CF$_3$SO$_2$)$_3$, NaBr, NaSCN, NaClO$_4$, KSCN and KClO$_4$. Of these metal salts, LiClO$_4$, LiBF$_4$, LiPF$_6$, LiAsF$_6$, LiCF$_3$SO$_3$, LiN(CF$_3$SO$_2$)$_2$ and LiC(CF$_3$SO$_2$)$_3$ are preferably used. These metal salts can be used either individually or in combination.

A carbonic ester is used as the nonaqueous solvent. Especially, at least one carbonic ester selected from among cyclic carbonic esters and chain carbonic esters is preferably used.

Examples of the cyclic carbonic esters include those represented by the general formula:

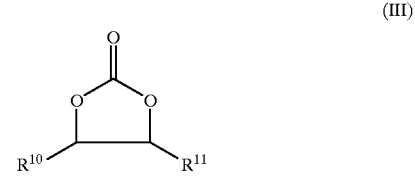

(III)

wherein $R^{10}$ and $R^{11}$ are identical with or different from each other and represent a hydrogen atom or a linear, branched or cyclic alkyl group. The linear alkyl group is preferably one having 1 to 4 carbon atoms such as a methyl group, an ethyl group, a propyl group or a butyl group. The branched alkyl group is preferably one having 1 to 4 carbon atoms such as an isopropyl group, an isobutyl group, a sec-butyl group or a tert-butyl group. The cyclic alkyl group is, for example, a cyclopropyl group or a cyclobutyl group. The cyclic carbonic esters are not limited to the 5-membered cyclic compounds represented by the above formula (III) and may be 6-membered cyclic compounds.

Specific examples of these carbonic esters include ethylene carbonate, propylene carbonate, 1,3-propylene carbonate, 1,3-butylene carbonate, 2,4-pentylene carbonate and 1,3-pentylene carbonate.

Of these cyclic carbonates, ethylene carbonate, propylene carbonate and a mixture thereof are preferred.

Examples of the chain carbonic esters include those represented by the general formula:

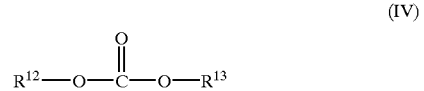

(IV)

wherein $R^{12}$ and $R^{13}$ are identical with or different from each other and represent a linear, branched or cyclic alkyl group, preferably, a linear or branched alkyl group having 1 to 4 carbon atoms or a cyclic alkyl group having 3 to 6 carbon atoms.

Specific examples of the chain carbonic esters include dimethyl carbonate, diethyl carbonate, di-n-propyl carbonate, dibutyl carbonate, diisopropyl carbonate and methyl ethyl carbonate.

Of these chain esters, dimethyl carbonate, diethyl carbonate and methyl ethyl carbonate are preferably used.

At least two members of the above chain carbonic esters may be used in combination. Especially, a mixed solvent consisting of a symmetric chain carbonic ester wherein $R^{12}$ and $R^{13}$ are identical with each other and an asymmetric chain carbonic ester wherein $R^{12}$ and $R^{13}$ are different from each other is preferred. In the mixing of a symmetric chain carbonic ester and an asymmetric chain carbonic ester, it is preferred that the ratio of the volume of symmetric chain carbonic ester to the volume of asymmetric chain carbonic ester range from 20:80 to 95:5, especially, from 30:70 to 90:10.

Moreover, in the present invention, a mixed solvent consisting of a cyclic carbonic ester and a chain carbonic ester is preferably used as the nonaqueous solvent. The mixing ratio of cyclic carbonic ester to chain carbonic ester (volume of cyclic carbonic ester volume of chain carbonic ester) preferably ranges from 10:90 to 90:10, still preferably, from 20:80 to 80:20.

In the polymeric gel electrolyte of the present invention, the ratio of the total weight of carbonic ester to the total weight of acrylic ester polymer (total weight of carbonic ester:total weight of acrylic ester polymer) preferably ranges from 40:60 to 90:10, still preferably, from 60:40 to 85:15. Although the carbonic ester is essentially contained as the nonaqueous solvent in the polymeric gel electrolyte of the present invention, the polymeric gel electrolyte may contain other solvents such as methyl ethyl ketone, γ-butyrolactone and dimethylformamide in a small amount not detrimental to the properties of the polymeric gel electrolyte of the present invention.

The salt of metal of Group Ia of the periodic table is preferably contained in the polymeric gel electrolyte of the present invention in an amount of 1 to 50% by weight, still preferably, 2 to 40% by weight substrated on the total weight of the polymeric gel electrolyte.

When the content of the salt of metal of Group Ia of the periodic table falls outside the above range, problems may be encountered such as a drop of ionic conductivity, a lowering of polymer viscosity/elasticity and a decrease of tensile strength.

The above polymeric gel electrolyte can be produced in the following manner.

The polymeric gel electrolyte is generally used in film form. Thus, it is preferably produced by performing a simultaneous polymerization of a solution containing the salt of metal of Group Ia of the periodic table, the nonaqueous solvent and the monomer represented by the general formula (I) or (II).

For example, the following processes can be employed.

[1] Process in which the following one or plurality of compounds are dissolved in a carbonic ester solvent in the presence of a Group Ia metal salt and the obtained solution is caused to flow on or applied by coating onto a flat substrate and either irradiated with ultraviolet rays or radiation or heated to thereby accomplish a simultaneous polymerization and curing:

(1) at least one compound selected from among acrylic esters represented by the above general formula (I) or (II);

(2) at least one compound selected from among acrylic esters represented by the above general formula (I) together with at least one compound selected from among acrylic esters represented by the above general formula (II) and a vinyl monomer, vinylidene monomer and vinylene monomer;

(3) at least one compound selected from among acrylic esters represented by the above general formula (I) together with at least one compound selected from among a vinyl compound, vinylidene compound and vinylene compound; or (4) at least one compound selected from among acrylic esters represented by the above general formula (II) together with at least one compound selected from among a vinyl monomer, vinylidene monomer and vinylene monomer.

In this process, the polymerization with ultraviolet irradiation may be conducted in the presence of a photosensitizer. For example, benzophenone, acetophenone or 2,2-dimethoxy-2-phenylacetophenone can be used as the photosensitizer.

When the polymerization is conducted by heating, use may be made of a thermal polymerization initiator. Examples of suitable thermal polymerization initiators include:

peroxides such as benzoyl peroxide and peroxydicarbonate, and azo compounds such as 2,2'-azobisisobutyronitrile.

These can be used either individually or in combination.

[2] Process in which the one or plurality of compounds specified in items (1) to (4) above are dissolved in a mixed solvent consisting of a carbonic ester and another organic solvent in the presence of a Group Ia metal salt and a polymerization initiator and the obtained solution is caused to flow on or applied by coating onto a flat substrate and heated to thereby accomplish a polymerization and curing. In this process, the organic solvent other than the carbonic ester may be evaporated after the spreading of the solution on the flat substrate. For example, methyl ethyl ketone, γ-butyrolactone or dimethylformamide can be used as the other organic solvent.

The polymeric gel electrolyte of the present invention has high ionic conductivity and is electrochemically stable. This polymeric gel electrolyte can suitably be used in electrochemical devices such as a primary battery, a secondary battery, a capacitor and an electrochromic display and in medical actuators.

Further, the polymeric gel electrolyte of the present invention can be used as a substitute for the organic electrolytic solution of lithium ion batteries. Still further, the polymeric gel electrolyte can be used as a binder for dispersing and fixing powdery electrode material on a current collector.

When this polymeric gel electrolyte is used in a battery, the battery can be prepared by first forming the polymeric gel electrolyte into a film and then interposing the film between a positive electrode and a negative electrode.

In the battery producing process including steps of forming a three-layer structure comprising a positive electrode, a separator and a negative electrode and thereafter impregnating the separator with an electrolytic solution, it is feasible to conduct the impregnation with the use of a solution consisting of an acrylic ester monomer, a salt of a metal of Group Ia of the periodic table and a nonaqueous solvent in place of the electrolytic solution and thereafter make a curing. Thus, the process modification can be minimized.

EFFECT OF THE INVENTION

The polymeric gel electrolyte of the present invention uses an acrylic ester polymer as a polymeric matrix and contains a specified nonaqueous solvent (carbonic ester), so that it has high ionic conductivity and is electrochemically stable. Thus, this polymeric gel electrolyte can suitably be used in electrochemical devices such as a primary battery, a secondary battery, a capacitor and an electrochromic display and in medical actuators.

EXAMPLE

The present invention will be further illustrated below with reference to the following Examples, which in no way limit the scope of the invention.

Example 1

2-Methacryloyloxyethyl methyl carbonate represented by the following formula (V) was used as an acrylic ester monomer:

$LiN(CF_3SO_2)_2$ as a Group Ia metal salt and Peroyl IPP50 (produced by Nippon Oil & Fats Co., Ltd.) were added to a mixture of 50% by weight of 2-methacryloyloxyethyl methyl carbonate and 50% by weight of propylene carbonate in respective amounts of 2 mol % substrated on the carbonate units and 1 mol % substrated on the acrylic ester monomer. The mixture was homogenized, cast on a glass plate and heated at 70° C. on a hot plate in an inert gas atmosphere for 30 min to thereby make a curing. Thus, a polymeric gel electrolyte having a thickness of about 1 mm was obtained.

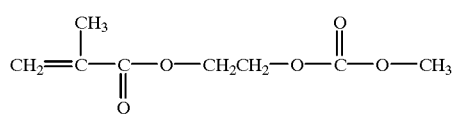

(V)

This polymeric gel electrolyte was punched into disks having a diameter of 10 mm. The obtained disk was interposed between electrodes secured to a conductivity measuring holder. While controlling the electrodes at 25° C. by Peltier device, a complex impedance measurement (measuring voltage: 10 mV) was performed by means of impedance analyzer HP4285A, thereby analytically determining the ionic conductivity thereof.

The results are given in Table 1.

Example 2

A polymeric gel electrolyte was produced in the same manner as in Example 1, except that an acrylic ester monomer consisting of a 5:5 molar ratio mixture of 2-methacryloyloxyethyl methyl carbonate and 2(2-methacryloyloxyethoxy)ethyl methyl carbonate represented by the following formula (VI) was used as an acrylic ester:

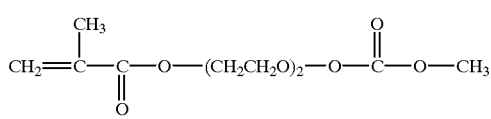

(VI)

The ionic conductivity of the obtained polymeric gel electrolyte was measured in the same manner as in Example 1. The results are given in Table 1.

Example 3

A polymeric gel electrolyte was produced in the same manner as in Example 1, except that a mixture of 30% by weight of di(2-methacryloylox-yethyl) carbonate represented by the following formula (VII) and 70% by weight of propylene carbonate was used in place of the mixture of 50% by weight of 2-methacryloyloxyethyl methyl carbonate and 50% by weight of propylene carbonate:

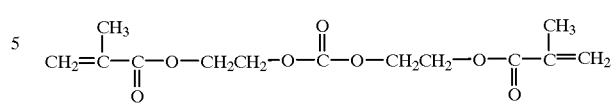

(VII)

The ionic conductivity of the obtained polymeric gel electrolyte was measured in the same manner as in Example 1.

The results are given in Table 1.

Example 4

A polymeric gel electrolyte was produced in the same manner as in Example 3, except that $LiPF_6$ was used in place of $LiN(CF_3SO_2)_2$ as a Group Ia metal salt.

The ionic conductivity of the obtained polymeric gel electrolyte was measured in the same manner as in Example 1.

The results are given in Table 1.

Example 5

Di(2-methacryloyloxyethyl) carbonate was used as an acrylic ester monomer. 22.2 parts by weight of di(2-methacryloyloxyethyl) carbonate, 66.5 parts by weight of propylene carbonate and 11.3 parts by weight of LiPF6 as a Group Ia metal salt were mixed together. Benzophenone was added to the mixture in an amount of 2 mol % substrated on the polymerizable double bond of the acrylic ester monomer and homogenized. The thus obtained liquid was cast on a glass plate and irradiated with ultraviolet rays emitted from a position of 7 cm above the plate in an inert gas atmosphere for 30 min by means of ultraviolet irradiator (UIS-25102 manufactured by Ushio Inc. with optical fiber unit SF-101Q) to thereby make a curing. Thus, a polymeric gel electrolyte having a thickness of about 0.5 mm was obtained.

The ionic conductivity of the obtained polymeric gel electrolyte was measured in the same manner as in Example 1.

The results are given in Table 1.

Example 6

Di(methacryloyltetra(oxyethylene)) carbonate represented by the following formula VIII was used as an acrylic ester monomer:

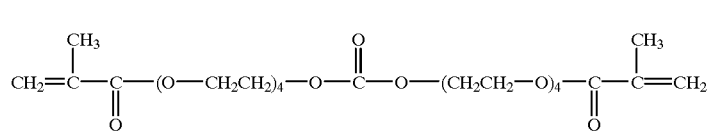

(VIII)

33.3 parts by weight of di(methacryloyltetra (oxyethylene)) carbonate was mixed with 66.7 parts by weight of an electrolytic solution obtained by dissolving $LiPF_6$ at a concentration of 1 mol/lit. in a solvent consisting of a 1:1 weight ratio mixture of ethylene carbonate and propylene carbonate. Peroyl IPP-50 was added to the mixture in an amount of 2 mol % substrated on the polymerizable double bond of the acrylic ester monomer and homogenized.

The thus obtained liquid was cast on a glass plate and heated at 70° C .on a hot plate in an inert gas atmosphere for 30 min to thereby make a curing. Thus, a polymeric gel electrolyte having a thickness of about 0.5 mm was obtained.

The ionic conductivity of the obtained polymeric gel electrolyte was measured in the same manner as in Example 1.

The results are given in Table 1.

Example 7

Di(2-acryloyloxypropyl) carbonate (in which the propyl group is branched)represented by the following formula IX was used as an acrylic ester monomer:

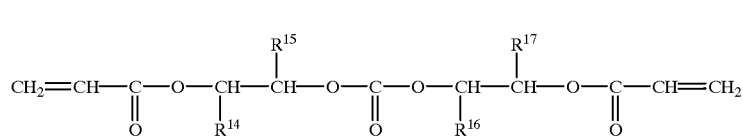

(IX)

wherein one of $R^{14}$ and $R^{15}$ is a methyl group and the other is a hydrogen atom, and also one of $R^{16}$ and $R^{17}$ is a methyl group and the other is a hydrogen atom. 25.0 parts by weight of di(2-acryloyloxyisopropyl) carbonate was mixed with 75.0 parts by weight of an electrolytic solution obtained by dissolving $LiPF_6$ at a concentration of 1 mol/lit. in a solvent consisting of a 1:1 weight ratio mixture of ethylene carbonate and propylene carbonate. Peroyl IPP-50 was added to the mixture in an amount of 2 mol % substrated on the polymerizable double bond of the acrylic ester monomer and homogenized. The thus obtained liquid was cast on a glass plate and heated at 70° C. on a hot plate in an inert gas atmosphere for 30 min to thereby make a curing. Thus, a polymeric gel electrolyte having a thickness of about 0.5 mm was obtained.

The ionic conductivity of the obtained polymeric gel electrolyte was measured in the same manner as in Example 1.

The results are given in Table 1.

Example 8

A polymeric gel electrolyte was produced in the same manner as in Example 7, except that di(acryloyltetra (oxyethylene)) carbonate represented by the following formula (X) was used in place of di(2-acryloyloxyisopropyl) carbonate:

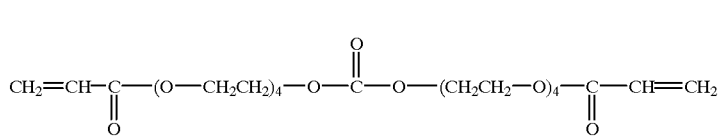

(X)

The ionic conductivity of the obtained polymeric gel electrolyte was measured in the same manner as in Example 1.

The results are given in Table 1.

Example 9

A polymeric gel electrolyte was produced in the same manner as in Example 6, except that a 3:1 weight ratio mixture of di(2-methacryloyloxyethyl) carbonate and di(methacryloyltetra(oxyethylene)) carbonate was used in place of di(methacryloyltetra(oxyethylene)) carbonate.

The ionic conductivity of the obtained polymeric gel electrolyte was measured in the same manner as in Example 1.

The results are given in Table 1.

Example 10

A polymeric gel electrolyte was produced in the same manner as in Example 1, except that a mixture of 30% by weight of an acrylic ester monomer consisting of a 1:9 molar ratio mixture of 2-methacryloyloxyethyl methyl carbonate and di(2-metha-cryloyloxyethyl) carbonate and 70% by weight of propyl-ene carbonate was used in place of the mixture of 50% by weight of 2-methacryloyloxyethyl methyl carbonate and 50% by weight of propylene carbonate.

The ionic conductivity of the obtained polymeric gel electrolyte was measured in the same manner as in Example 1.

The results are given in Table 1.

Example 11

A polymeric gel electrolyte was produced in the same manner as in Example 3, except that a 1:1 weight ratio mixture of di(2-methacryloyloxyethyl) carbonate and methoxydiethylene glycol methacrylate represented by the following formula (XI) was used in place of the di(2-methacryloyloxyethyl) carbonate:

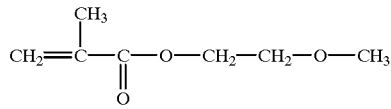

(XI)

The ionic conductivity of the obtained polymeric gel electrolyte was measured in the same manner as in Example 1.

The results are given in Table 1.

Example 12

A polymeric gel electrolyte was produced in the same manner as in Example 3, except that a mixture of 50% by weight of di(2-methacryloyloxyethyl) carbonate and 50% by weight of acrylonitrile was used in place of the 2-methacryloyloxyethyl methyl carbonate and that LiPF6 was used in place of the LiN(CF$_3$SO$_2$)$_2$ as a Group Ia metal salt.

The ionic conductivity of the obtained polymeric gel electrolyte was measured-in the same manner as in Example 1.

The results are given in Table 1.

Example 13

A polymeric gel electrolyte was produced in the same manner as in Example 5, except that a mixture consisting of 45.5 parts by weight of di(2-methacryloyloxyethyl) carbonate, 45.5 parts by weight of NK ester M-40G represented by the following formula (XII) (produced by Shin-Nakamura Chemical Co., Ltd.) and 9.0 parts by weight of NK ester TMPT represented by the following formula (XIII) (produced by Shin-Nakamura Chemical Co., Ltd.) was used as an acrylc ester monomer:

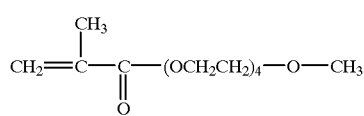

(XII)

and

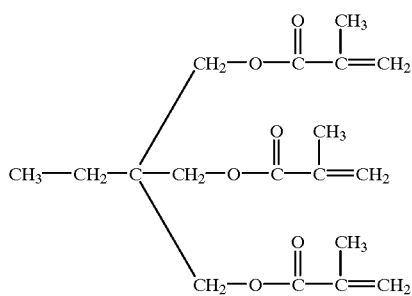

(XIII)

The ionic conductivity of the obtained polymeric gel electrolyte was measured in the same manner as in Example 1.

The results are given in Table 1.

Example 14

A polymeric gel electrolyte was produced in the same manner as in Example 3, except that a solvent consisting of a 1:1 weight ratio mixture of propylene carbonate and dimethyl carbonate was used in place of the propylene carbonate and that LiPF$_6$ was used in place of the LiN(CF$_3$SO$_2$)$_2$ as a Group Ia metal salt. The ionic conductivity of the obtained polymeric gel electrolyte was measured in the same manner as in Example 1.

The results are given in Table 1.

Example 15

A polymeric gel electrolyte was produced in the same manner as in Example 3, except that a solvent consisting of a 2:2:1 weight ratio mixture of propylene carbonate, dimethyl carbonate and methyl ethyl carbonate was used in place of the propylene carbonate and that LiPF6 was used in place of the LiN(CF$_3$SO$_2$)$_2$ as a Group Ia metal salt.

The ionic conductivity of the obtained polymeric gel electrolyte was measured in the same manner as in Example 1.

The results are given in Table 1.

TABLE 1

| Measuring Results of Ionic Conductivity (measured at 25° C.) | |
| --- | --- |
| Examples | Ion Conductivity (S/cm) |
| Example 1 | $8.5 \times 10^{-4}$ |
| Example 2 | $1.9 \times 10^{-3}$ |
| Example 3 | $2.5 \times 10^{-3}$ |
| Example 4 | $1.1 \times 10^{-3}$ |
| Example 5 | $9.0 \times 10^{-4}$ |
| Example 6 | $7.0 \times 10^{-4}$ |
| Example 7 | $4.9 \times 10^{-3}$ |
| Example 8 | $4.1 \times 10^{-3}$ |
| Example 9 | $1.5 \times 10^{-3}$ |
| Example 10 | $3.1 \times 10^{-6}$ |
| Example 11 | $2.0 \times 10^{-3}$ |
| Example 12 | $4.1 \times 10^{-4}$ |
| Example 13 | $1.9 \times 10^{-3}$ |
| Example 14 | $8.6 \times 10^{-4}$ |
| Example 15 | $9.7 \times 10^{-5}$ |

What is claimed is:
1. A polymeric gel electrolyte comprising:
 (a) an acrylic ester polymer matrix containing structural units derived from at least one acrylic ester selected from among acrylic esters represented by the general formulae:

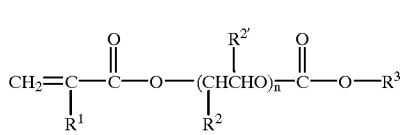
(I)

wherein $R^1$, $R^2$ and $R^{2'}$ are identical with or different from each other and represent a hydrogen atom or an alkyl group having 1 to 4 carbon atoms, $R^3$ represents an alkyl group having 1 to 4 carbon atoms, and n is an integer of 1 to 100, and

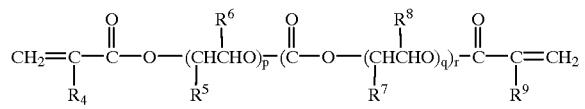
(II)

wherein $R^4$ to $R^9$ are identical with or different from each other and represent a hydrogen atom or an alkyl group having 1 to 4 carbon atoms, and p, q and r are identical with or different from each other and are an integer of 1 to 100;

(b) a nonaqueous solvent including at least a cyclic carbonic ester; and (c) a salt of a metal of Group Ia of the periodic table.

2. A polymeric gel electrolyte comprising:

(a) an acrylic ester polymer matrix containing structural units derived from at least one acrylic ester selected from among acrylic esters represented by the general formulae:

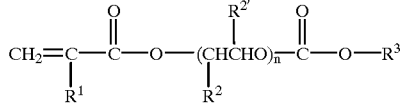
(I)

wherein $R^1$, $R^2$ and $R^{2'}$ are identical with or different from each other and represent a hydrogen atom or an alkyl group having 1 to 4 carbon atoms, $R^3$ represents an alkyl group having 1 to 4 carbon atoms, and n is an integer of 1 to 100, and

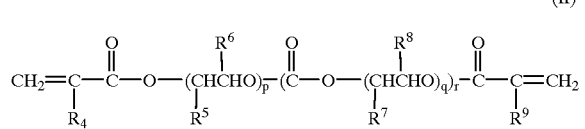
(II)

wherein $R^4$ to $R^9$ are identical with or different from each other and represent a hydrogen atom or an alkyl group having 1 to 4 carbon atoms, and p, q and r are identical with or different from each other and are an integer of 1 to 100;

(b) a nonaqueous solvent including at least a chain carbonic ester; and (c) a salt of a metal of Group Ia of the periodic table.

3. The polymeric gel electrolyte as claimed in claim 1 or 2, wherein the acrylic ester polymer matrix is a homopolymer or copolymer of an acrylic ester selected from among acrylic esters represented by the general formulae (I) and (II).

4. A polymeric gel electrolyte comprising:

(a) an acrylic ester polymer matrix which is a copolymer of an acrylic ester represented by the general formulae:

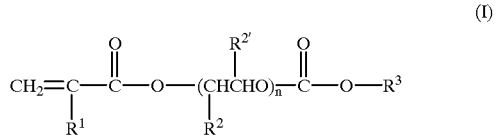
(I)

wherein $R^1$, $R^2$ and $R^{2'}$ are identical with or different from each other and represent a hydrogen atom or an alkyl group having 1 to 4 carbon atoms, $R^3$ represents an alkyl group having 1 to 4 carbon atoms, and n is an integer of 1 to 100, and

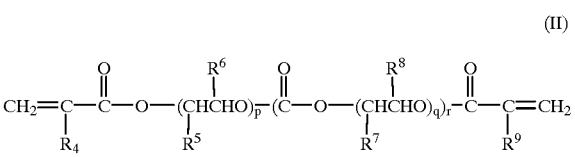
(II)

wherein $R^4$ to $R^9$ are identical with or different from each other and represent a hydrogen atom or an alkyl group having 1 to 4 carbon atoms, and p, q and r are identical with or different from each other and are an integer of 1 to 100; and a vinyl monomer, vinylidene monomer, or vinylene monomer copolymerizable with the acrylic ester represented by the general formulae (I) or (II), (b) a nonaqueous solvent of a carbonic ester; and (c) a salt of a metal of Group Ia of the periodic table.

5. The polymeric gel electrolyte as claimed in claim 4, wherein the vinyl monomer, vinylidene monomer or vinylene monomer is a vinyl ester, a vinyl ether, a (meth) acrylic ester, an allyl ether, an allyl ester or a cyclic olefin.

6. The polymeric gel electrolyte as claimed in claim 4 wherein the nonaqueous solvent is at least one carbonic ester selected from the group consisting of a cyclic carbonic ester and a chain carbonic ester.

7. The polymeric gel electrolyte as claimed in claim 1 or 6, wherein:

the cyclic carbonic esters are ethylene carbonate, propylene carbonate and mixtures thereof.

8. The polymeric gel electrolyte as claimed in claim 1 or 6, wherein the nonaqueous solvent is a mixed solvent of a cyclic carbonic ester and a chain carbonic ester.

9. The polymeric gel electrolyte as claimed in claim 8, wherein the cyclic carbonic ester and the chain carbonic ester are used in a volume ratio (cyclic carbonic ester:chain carbonic ester) of 10:90 to 90:10.

10. The polymeric gel electrolyte as claimed in claim 2 or 6, wherein the chain carbonic ester is a mixture of a symmetric chain carbonic ester and an asymmetric chain carbonic ester.

11. The polymeric gel electrolyte as claimed in claim 10, wherein the symmetric chain carbonic ester and the asymmetric chain carbonic ester are used in a volume ratio (symmetric chain carbonic ester:asymmetric chain carbonic ester) of 20:80 to 95:5.

12. The polymeric gel electrolyte as claimed in claims 1, 2 or 4, wherein the nonaqueous solvent and the acrylic ester polymer are used in a total weight ratio (total weight of nonaqueous solvent:total weight of acrylic ester polymer) of 40:60 to 90:10.

13. The polymeric gel electrolyte as claimed in claims 1, 2 or 4, wherein the salt of metal of Group Ia of the periodic table is at least one lithium salt selected from among $LiClO_4$, $LiBF_4$, $LiPF_6$, $LiAsF_6$, $LiCF_3SO_3$, $LiN(CF_3SO_2)_2$ and $LiC(CF_3SO_2)_3$.

14. A process for producing the polymeric gel electrolyte of claims 1, 2 or 4, which comprises performing a simultaneous polymerization of a solution containing the salt of metal of Group Ia of the periodic table, the nonaqueous solvent of carbonic ester and the monomer represented by the general formula (I) or (II).

15. The polymeric gel electrolyte as claimed in claim 2 or 6, wherein the chain carbonic esters are dimethyl carbonate, methyl ethyl carbonate, methyl propyl carbonate and mixtures thereof.

* * * * *